United States Patent [19]

Oberhuber

[11] 4,344,536
[45] Aug. 17, 1982

[54] AIR CUSHION FOIL FOR PACKAGING PURPOSES

[76] Inventor: Dieter Oberhuber, 8000 Me,uml/u/nchen 40, BRD, Stengelstrasse 1, Fed. Rep. of Germany

[21] Appl. No.: 150,036

[22] Filed: May 15, 1980

[30] Foreign Application Priority Data

May 21, 1979 [DE] Fed. Rep. of Germany ... 7914659[U]

[51] Int. Cl.³ .................... B65D 81/14; B65D 85/30
[52] U.S. Cl. .................... 206/594; 206/460; 206/813; 217/53; 229/3.5 R; 229/87 R; 156/290
[58] Field of Search ............... 206/594, 521, 460, 813, 206/819, 426; 229/87 R, 3.5 R; 217/53; 156/290

[56] References Cited

U.S. PATENT DOCUMENTS

| 2,744,624 | 5/1956 | Hoogstoel et al. | 206/426 |
| 3,018,015 | 1/1962 | Agriss et al. | 217/53 |
| 3,142,599 | 7/1964 | Chavannes | 206/819 |
| 3,231,454 | 1/1966 | Williams | 206/594 |
| 3,769,145 | 10/1973 | Gresham et al. | 156/290 |

FOREIGN PATENT DOCUMENTS 2318582 11/1974 Fed. Rep. of Germany .

Primary Examiner—William T. Dixson, Jr.
Attorney, Agent, or Firm—Felfe & Lynch

[57] ABSTRACT

An air cushion foil (1) especially for packaging purposes, comprises a first smooth foil (2) of synthetic material and a second foil (4) having pocket-like depressions (3). The two foils are so connected with one another that the first foil (2) closes the pocket-like depressions (3) of the second foil (4) and forms pockets having pocket bases (6), pocket side walls (7) and curved transition regions (8) between the bases and the side walls. The pocket bases and curved transition regions are subjected to a roughening pre-treatment and are covered with a layer (9) of adhesive so that the foil can be stuck to goods to be packaged and pulled away without leaving adhesive on the goods.

7 Claims, 1 Drawing Figure

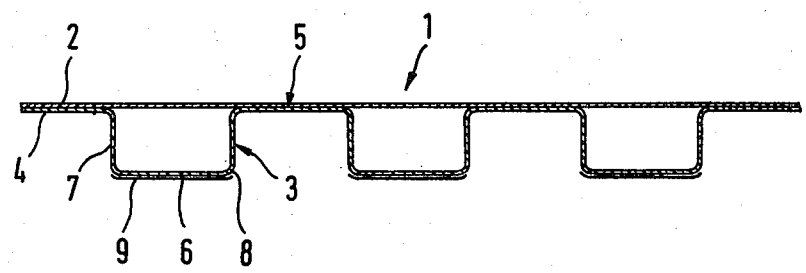

AIR CUSHION FOIL FOR PACKAGING PURPOSES

The invention relates to an air cushion foil, especially for packaging purposes comprising a first smooth foil of synthetic material and a second foil having pocket-like depressions with the two foils being so connected with one another that the first foil closes the pocket-like depressions of the second foil and in which the pocket-like depressions each comprise a base, a side wall and a curved transition region between the base and the side wall.

The air chambers of the air cushion foil, also named bubble foil, and formed by the pocket-like depressions endow this foil with its excellent characteristics namely excellent protection of the packaged goods against mechanical influences, at a low weight of the foil, and, in addition, heat insulating characteristics which are of particular advantage for certain goods. The air cushion foil which is laid around the item to be packaged is fastened to the item by cords or bands or by a layer of adhesive. When using an adhesive layer however remnants of adhesive frequently remain on the packaged item after pulling away the air cushion foil and the removal of the adhesive remnants is often troublesome and can often only be achieved in a way that results in damage to the packaged item.

The task underlying the present invention is to avoid the shortcomings of known air cushion foils and to provide an air cushion foil of the type initially named which enables simple and damage-free attachment and removal of the air cushion foil relative to the packaged item.

This task is accomplished in accordance with the invention in that only the curved transition regions and pocket bases which have been subjected to an abrasive or oxidising treatment are covered with a layer which consists only of an adhesive.

The new air cushion foils, which preferably consist of polyethylene, are thus intentionally abrasively pre-treated both in the region of the pocket bases and also in the curved transition regions to the pocket side walls for example by means of a corona treatment. In this way it is ensured that the adhesive layer applied in these two regions securely adheres to the foil so that remnants of adhesive on the packaged item after pulling off of the air cushion foil are prevented in an acceptable manner.

A cross-section through an embodiment of the new air cushion foil is shown in the single schematic FIGURE.

The air cushion foil (1) comprises a first flat covering foil of synthetic material (2) and a second foil of synthetic material (4) which is provided with pocket-like depressions (3). The two foils (2) and (4), which consist for example of polyethylene, are connected together in the region (5) for example by welding. The pocket-like depressions (3) each comprise a pocket base (5) a pocket side wall (7) and a curved transition region (8) between the pocket base (6) and the pocket side wall (7). An adhesive layer (9) is applied in the area of the pocket bases (6) and the curved transition regions (8) which have been correspondingly pre-treated in order to increase the adhesion. This pre-treatment can be either an abrasive or oxidizing pre-treatment and can be effected by means of a corona discharge. Its purpose is to produce a roughening of the surface i.e. an increase in the micro-surface area thereof so that the bond between the adhesive, e.g. aqueous dispersions based on acrylic acid esters, and the foil is improved. The bond should reach a level at which the adhesive will adhere better to the foil than to the item to which the foil is to be attached. It will be appreciated that the foil of the invention will usually have an array of pocket-like depressions and that the specific arrangement may be varied in many ways without departing from the scope of the present teaching. For example it is contemplated that the first foil may also be provided with pocket-like depressions complementary to or staggered with respect to the array of pocket-like depressions in the second foil.

The above-named adhesives, which are the preferred adhesives, have the further advantage that they are not aggressive, are free from plasticizers and are able to meet the food packaging requirements of the Federal Republic of Germany, i.e. an adhesive of this kind is not damaging to health when correctly used.

I claim:

1. Air cushion foil, suitable for packaging purposes, comprising a first smooth foil of synthetic material and a second foil having pocket-like depressions; with said first and second foils being so connected with one another that the first foil closes the pocket-like depressions of the second foil; each said pocket-like depression comprises a pocket base, a pocket side wall and a curved transition region between the pocket base and the pocket side wall, each said pocket base and transition region having been subjected to a corona discharge pre-treatment to increase the microsurface area thereof; and an adhesive layer applied to said foil solely to said pre-treated pocket bases and transition regions whereby the entire adhesive layer is strongly adhered to said foil.

2. Air cushion foil in accordance with claim 1 and wherein said adhesive is a contact adhesive.

3. Air cushion foil in accordance with claim 1 and in which said foil consists of polyethylene.

4. Air cushion foil in accordance with claim 1 and in which said first foil is flat.

5. Air cushion foil in accordance with claim 1 and in which said pocket bases are flat.

6. Air cushion foil in accordance with claim 1 and in which said pocket-like depressions are arranged in a regular array.

7. A method of manufacturing an air cushion foil comprising the steps of joining together a first flat foil of synthetic material and a second foil of synthetic material having a plurality of pocket-like depressions therein to form a plurality of pockets, said pocket-like depressions having pocket bases and pocket side walls with curved transition regions between said pocket bases and said pocket side walls, subjecting said pocket bases and curved transition regions to a corona discharge pre-treatment either before or after joining said first foil to said second foil whereby to increase the microsurface thereof and subsequently applying an adhesive layer to, exclusively, said pocket bases and transition regions whereby the entire adhesive layer is strongly adhered to said regions.

* * * * *